Patented June 12, 1951

2,557,051

UNITED STATES PATENT OFFICE 2,557,051

PREPARATION OF ALKYL-ARALKYL KETONES

Richard V. Heinzelmann, Kalamazoo, Mich., assignor to The Upjohn Company, Kalamazoo, Mich., a corporation of Michigan No Drawing. Application April 30, 1948, Serial No. 24,429

5 Claims. (Cl. 260—590)

The present invention relates to an improved process for the preparation of mixed alkyl-aralkyl ketones and products produced thereby.

The products produced by the method of the present invention have the general formula:

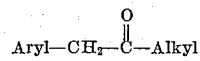

wherein the Aryl portion of the molecule is a substituted or unsubstituted phenyl or naphthyl radical and wherein the Alkyl portion of the molecule contains from one to eight carbon atoms, inclusive. The compounds are useful intermediates in the preparation of therapeutically-active amines.

The method for the preparation of mixed alkyl-aralkyl ketones by the combined reduction and hydrolysis of $\alpha$-alkyl-$\beta$-arylnitroethenes has been described [J. Org. Chem. 12, 501 (1947)]. This process is operative only when the nitroalkene has been isolated from the mixture of reaction products produced by condensing an aromatic aldehyde and a nitro paraffin. When it is attempted to conduct the condensation according to known procedure followed by reduction and hydrolysis without first isolating the intermediate $\alpha$-alkyl-$\beta$-arylnitroethene prior to reduction and hydrolysis, none of the desired ketone is obtained and a unitary process is impossible. For some reason, perhaps because of unreacted starting material or by-product formed during the condensation, transformation of the $\alpha$-alkyl-$\beta$-arylnitroethene without isolation into an alkyl-aralkyl ketone is blocked. The step of isolating the intermediate product, which is therefore mandatory in such prior procedures, greatly reduces the efficiency of the process and prevents economic commercial utilization thereof. It would be highly desirable to have available a commercially utilizable process for the preparation of mixed alkyl-aralkyl ketones which could be conducted as a unitary process starting from the aromatic aldehyde and which would not involve isolation of any intermediate product.

It is an object of the present invention to provide a synthesis of mixed alkyl-aralkyl ketones which does not involve separation of the intermediate $\alpha$-alkyl-$\beta$-arylnitroethene from the mixture of reaction products produced by the condensation of a nitro paraffin and an aromatic aldehyde. Other objects of the invention will become apparent hereinafter.

The objects of this invention are accomplished by first condensing an aromatic aldehyde with a polycarbon nitro paraffin and removing water formed during the condensation by distillation from the reaction zone or distillation with solvent from the reaction zone, as claimed in my copending application Serial 24,430, filed concurrently herewith. When this method of condensation, involving the prompt removal of water formed as one condensation product, is used as the first step in the ketone synthesis, it is unnecessary to isolate the $\alpha$-alkyl-$\beta$-arylnitroethene from the mixture of reaction products before carrying out the remainder of the synthesis, which involves simultaneous reduction and hydrolysis with iron and an aqueous mineral acid.

It could not be foreseen that elimination of a step which is critical in the procedure of the prior art, namely, isolation of the intermediate $\alpha$-alkyl-$\beta$-arylnitroethene, would result in an improved yield of the desired ketone product, and, in fact, it was expected that the procedure would be inoperative without this step. Thus, a time-saving unitary and economical procedure for attaining improved yields of desired ketone is unexpectedly provided by the method of the present invention.

To be suitable for use in the method of this invention, in addition to being water-insoluble, the solvent, when employed, should be free of reactive groups, such as the carbonyl group, and should not have such a high boiling point as to cause decomposition of the reactants or reaction products. Suitable solvents are butyl and amyl alcohols and hydrocarbons boiling from 70 to 150 degrees centigrade, such as heptanes, octanes, benzene, toluene, or xylene. In a particular embodiment of the invention, a preferred reaction solvent is toluene.

The starting aromatic aldehyde contains the aldehyde group attached directly to the phenyl or naphthyl ring. Representative compounds are benzaldehyde, naphthaldehyde, alkyl-substituted benzaldehydes and naphthaldehydes, halogen-, nitro-, amino-, hydroxy- and alkoxy-substituted benzaldehydes and naphthaldehydes, and the like. Specific compounds which may be mentioned are ortho- and meta-alkoxy- (e. g., methoxy, ethoxy, et cetera)-benzaldehydes, the corresponding anisaldehydes (para-methoxybenzaldehydes), 3,4-dimethoxybenzaldehyde, benzaldehyde itself, para-methylbenzaldehyde, para-isopropylbenzaldehyde, para-chlorobenzaldehyde, naphthaldehyde, methylnaphthaldehyde, para-methoxynaphthaldehyde, and the like. A preferred embodiment of the invention contemplates the use of alkoxy-benzaldehydes as the aromatic aldehyde starting material.

The nitro paraffin employed should be a polycarbon nitro paraffin wherein the nitro group is attached to a carbon atom which is in turn attached to no more than one carbon atom, i. e., the nitro group should be attached to a primary carbon atom. These polycarbon nitro paraffins are referred to as primary polycarbon nitro paraffins herein, as those nitro paraffins having a tertiary structure do not ordinarily undergo condensations with aldehydes and those having a secondary structure do not undergo the required dehydration. By "polycarbon" is of course intended a nitro paraffin having more than one carbon atom, thus excluding nitromethane, the use of which in condensation with aldehydes is not attended by the difficulties and disadvantages accruing to the use of polycarbon nitro paraffins and which does not give the desired ketone product. The type of nitro paraffin which will condense with aldehydes is well defined, but only primary nitro paraffins are suitable for the purposes of this invention. Representative primary nitro paraffins are thus nitroethane, nitropropane, nitrobutane, nitropentane, 1-nitro-2-methylpropane, and the like, with straight-chain primary nitro paraffins being preferred. The type of nitro paraffin which will undergo condensation with an aldehyde is so well defined in the art that it should be unnecessary to delimit this reactant further than to say that it should be a primary nitro paraffin capable of undergoing aldehyde condensation.

The type of catalyst employed in the condensation is also known in the art. This may be any basic catalyst, preferably one which is soluble in the organic reaction solvent, such as primary aliphatic amines. Other catalysts which are recognized in the art as suitable for this type of condensation may also be used.

A satisfactory method of conducting the condensation is to mix approximately equimolar quantities of aromatic aldehyde and nitro paraffin in toluene or other selected solvent, and to add a soluble basic catalyst such as a primary aliphatic amine, e. g., butyl or amyl amine. The solution may be placed in a suitable reaction container equipped with a condenser and a suitable trap wherein the condenser distillate is collected, water formed during the reaction (and codistilled with the solvent) separated from the condensate, and the solvent returned to the reaction zone. The course of reaction may be followed by observing the quantity of water obtained from the reaction, the reaction being considered complete when no more water is collected. In practice this usually occurs when nearly the calculated quantity has been removed from the reaction zone. The length of time required to remove the water may vary between 4 and 20 hours depending upon the solvent, the particular reactants, the quantity of material used, and the rate of distillation. In general, lower-boiling solvents require a longer period for complete removal of water, but the percentage conversion of the aldehyde to nitroethene is substantially the same irrespective of the solvent used or the time required for the complete removal of water.

Following completion of the condensation step, the water trap may be removed from the system, finely-divided iron and aqueous mineral acid, e. g., hydrochloric acid or sulfuric acid, added, and the ketone preparation carried out according to known procedure. A ferric salt may be added as a catalyst if desired, but its use is not mandatory. The solution is heated, preferably, but not necessarily, at about reflux, usually for a period of about one to eight hours, whereafter the resulting ketone is isolated. The isolation of the ketone may be accomplished either by steam distillation of the mixture of reaction products, followed by extraction of the distillate with solvent and fractional distillation, or, after removal of residual iron by decantation or filtration, by extraction directly from the mixture with solvent and subsequent fractional distillation. The selection of a preferred method of isolation will depend upon the particular ketone prepared and will be apparent to one skilled in the art.

An alternative method of carrying out the synthesis involves the removal of condensation solvent, preferably by distillation under reduced pressure, followed by the reductive hydrolysis and isolation of product. This procedure is operative but involves additional heating of the intermediate alkylarylnitroethenes, which are characterized by explosive instability. It is therefore preferred to avoid treatment thereof at elevated temperatures as much as possible, and comparative freedom from hazard of the preferred procedure is an additional advantage over the method of the prior art which may require distillation to properly purify or isolate the intermediate α-alkyl-β-arylnitroethene.

The following examples are illustrative of the present invention but are not to be construed as limiting.

COMPARATIVE EXAMPLE 1.—PRIOR ART PROCEDURE

Sixty-eight grams of ortho-methoxybenzaldehyde, 37.5 grams of nitroethane and 10 milliliters of n-butylamine were dissolved in 90 milliliters of absolute ethanol. The mixture was heated under reflux for six and one-half hours, [similar to J. Org. Chem. 12, 501 (1947)]. The alcohol was removed in vacuo, whereafter 130 grams of finely-divided iron, 260 milliliters of water, and 1.0 gram of ferric chloride were added to the residual oil. The reaction mixture was heated to boiling with stirring and 130 milliliters of concentrated hydrochloric acid added thereto over a period of eight hours. After heating for an additional hour, the suspension was steam-distilled, the distillate extracted with benzene, and the benzene extract fractionally distilled. No ortho-methoxy-phenylacetone was obtained.

COMPARATIVE EXAMPLE 2.—PRIOR ART PROCEDURE

Two hundred fifty grams of distilled α-methyl-β-(ortho-methoxyphenyl)-nitroethene, five hundred grams of finely-divided iron, 1000 milliliters of water, and 5.0 grams of ferric chloride were heated under reflux with efficient stirring. Five hundred milliliters of concentrated hydrochloric acid was added dropwise over a period of seven and one-half hours, whereafter the resulting mixture was subjected to steam distillation until 12 liters of distillate was collected. The distillate was extracted with ether, the ethereal extract dried, and the ether removed. The residual pale yellow oil was distilled and 176 grams of ortho-methoxyphenylacetone, boiling at 128–131 degrees centigrade at a pressure of 14 millimeters of mercury, a yield of 82 percent, was collected. Pure ortho-methoxyphenylacetone has a $n_D^{20}$ of 1.5236 and a dinitrophenyl hydrazone melting approximately at 125 degrees centigrade. The above percentage yield was based on the pure α - methyl - β - (ortho - methoxyphenyl) - nitro - ethene used as starting material.

Example 1

Two hundred grams of ortho-methoxybenzaldehyde, 150 grams of nitroethane and 40 milliliters of n-butyl amine were dissolved in 400 milliliters of toluene in a flask equipped with a reflux condenser and suitable water separation trap and the mixture heated under reflux until the collection of water ceased.

The water trap was then removed from the system and a stirrer introduced into the flask. Seven hundred fifty grams of finely-divided iron, 1500 milliliters of water and 7.0 grams of ferric chloride were then added. The mixture was then heated to boiling and, while stirring vigorously, 750 milliliters of concentrated hydrochloric acid was added dropwise over a period of four hours. The reaction mixture was subjected to steam distillation, 18 liters of distillate being collected. The toluene layer was removed and the aqueous layer extracted with fresh toluene. The combined toluene extracts were fractionally distilled, yielding 247 grams of ortho-methoxyphenylacetone boiling at 126–132 degrees centigrade at a pressure of 14 millimeters of mercury, $n_D^{20}$ of 1.5277. This amounted to a yield of 75.5 percent of the theoretical based on the starting ortho-methoxybenzaldehyde.

Example 2

Two hundred grams of ortho-methoxybenzaldehyde, 150 grams of nitroethane, and 40 milliliters of n-butyl amine were condensed in toluene as in Example 1. After evolution of water had ceased, the toluene was removed in vacuo and the crude residual oil reduced and hydrolyzed as in Example 1. The resulting ortho-methoxyphenylacetone was isolated by steam distillation, extraction of the steam distillate and fractional distillation, to give 255 grams of product distilling at 126–132 degrees centigrade at a pressure of 14 millimeters of mercury: $n_D^{20}=1.5263$. The yield was 77.5 percent of the theoretical.

Example 3

In the same manner as given for Example 1, aproximately equimolar proportions of benzaldehyde and nitroethane are condensed in toluene in the presence of n-butyl amine at about reflux temperature, the distillate collected, water removed, and toluene returned to the reaction zone. After about six hours the calculated quantity of water has been removed from the reaction zone and the iron, water and ferric chloride are added thereto. Concentrated hydrochloric acid is then added dropwise to the mixture at about reflux temperature with vigorous agitation over a period of about six hours. Upon steam distillation of the product and removal of the toluene, extraction of the aqueous layer with fresh toluene, and fractional distillation of the extracts, approximately 75 percent of the theoretical yield of desired phenylacetone is obtained.

Example 4

In the same manner as given for Example 1, benzaldehyde and nitropropane are condensed, water produced by the reaction being removed during the process, and iron, water and ferric chloride added. Addition of concentrated hydrochloric acid with stirring and heating and subsequent recovery of the product gives nearly 70 percent yields of desired benzylethyl ketone.

Example 5

In the manner of the previous examples, naphthaldehyde and nitroethane are condensed and the reaction product hydrolyzed and reduced with iron and aqueous hydrochloric acid to give a high yield of naphthylacetone.

The steam distillation product recovery step in the above examples may be replaced by solvent extraction of the mixture of reaction products. However, a more efficient fractionation is required to yield relatively pure ketone using solvent extraction than when steam distillation is employed.

Various modifications may be made in the present invention without departing from the spirit or scope thereof, and it is to be understood that I limit myself only as defined in the appended claims.

I claim:

1. A process for the preparation of mixed aralkyl-alkyl ketones, which includes the steps of (1) condensing an aromatic aldehyde selected from the group consisting of benzaldehydes and naphthaldehydes with a primary nitro-paraffin having at least two carbon atoms while continuously removing by distillation the water formed by the condensation, (2), reducing and hydrolyzing the thus-prepared condensation product without isolation thereof by heating with iron and a mineral acid in the presence of water, and (3) isolating the resulting aralkyl-alkyl ketone from the reaction mixture.

2. A process for the preparation of mixed aralkyl-alkyl ketones which includes the steps of (1) condensing an aromatic aldehyde selected from benzaldehydes and naphthaldehydes with a primary nitro paraffin having at least two carbon atoms in a water-insoluble solvent, while continuously distilling solvent from the reaction mixture together with water produced by the condensation, (2) reducing and hydrolyzing the thus prepared condensation product without isolation by adding iron and aqueous mineral acid and heating the mixture, and (3) isolating the resulting aralkyl-alkyl ketone.

3. A process for the preparation of mixed aralkyl-alkyl ketones which includes the steps of (1) condensing an aromatic aldehyde selected from benzaldehydes and naphthaldehydes with nitroethane in a water-insoluble solvent boiling between 70 and 150 degrees centigrade, (2) distilling the solvent from the reaction mixture together with water formed by the condensation, substantially as rapidly as the water is formed, (3) separating the water from the solvent, (4) returning the solvent to the reaction zone until substantially no water codistills with the solvent, (5) adding iron and aqueous mineral acid to the condensation product without isolation thereof, (6) heating the mixture, and (7) isolating the resulting arylacetone from the mixture of reaction products.

4. The process of claim 3, wherein solvent is removed from the mixture of reaction products prior to step (5).

5. A process for the preparation of ortho-methoxyphenylacetone which includes the steps of (1) condensing orthomethoxybenzaldehyde with nitroethane in a refluxing toluene solution, (2) distilling toluene from the solution together with water produced by the condensation, (3) separating water from the condensed distillate, (4) returning the toluene to the reaction zone until subtantially no water codistills with the toluene, (5) adding finely-divided iron and an aqueous mineral acid to the condensation product without isolation thereof, (6) heating the mixture at about reflux for from one to eight hours, and (7) isolating ortho-methoxyphenylacetone from the mixture of reaction products.

RICHARD V. HEINZELMANN.

REFERENCES CITED

The following references are of record in the file of this patent:

UNITED STATES PATENTS

| Number | Name | Date |
|---|---|---|
| 2,076,111 | Bannister | Apr. 6, 1937 |
| 2,233,823 | Susie et al. | Mar. 4, 1941 |
| 2,383,603 | Larrison et al. | Aug. 28, 1945 |
| 2,410,642 | Farkas et al. | Nov. 5, 1946 |
| 2,415,046 | Senkus | Jan. 28, 1947 |
| 2,427,822 | Tindall | Sept. 23, 1947 |

OTHER REFERENCES

Hoover et al., J. Org. Chem., vol. 12, pages 501–505 (1947).

Guillaumin, Chemical Abstracts, vol. 4, pages 2300 (1910).